(12) United States Patent
Prelogar et al.

(10) Patent No.: US 11,368,775 B1
(45) Date of Patent: Jun. 21, 2022

(54) CONTROL HANDOFF AND POWER HANDLING AUDIO DEVICE

(71) Applicant: Piearcings, LLC, Kansas City, MO (US)

(72) Inventors: Barrett Prelogar, Lake Ozark, MO (US); Troy Calderwood, Wellsville, KS (US); David Warner, Overland Park, KS (US)

(73) Assignee: Piearcings, LLC, Kansas City, MO (US)

( * ) Notice: Subject to any disclaimer, the term of this patent is extended or adjusted under 35 U.S.C. 154(b) by 0 days.

(21) Appl. No.: 16/100,776

(22) Filed: Aug. 10, 2018

Related U.S. Application Data (60) Provisional application No. 62/543,585, filed on Aug. 10, 2017.

(51) Int. Cl.
*H04R 1/10* (2006.01)

(52) U.S. Cl.
CPC ......... *H04R 1/1041* (2013.01); *H04R 1/1016* (2013.01); *H04R 1/1025* (2013.01); *H04R 2420/07* (2013.01)

(58) Field of Classification Search
CPC ............ H04R 2460/00; H04R 2225/83; H04R 2225/81; H04R 2225/77; H04R 2225/67; H04R 2225/63; H04R 2225/61; H04R 2225/59; H04R 2225/53; H04R 2225/51; H04R 2225/49; H04R 2225/43; H04R 2225/41; H04R 2225/33; H04R 2225/31; H04R 2225/025; H04R 2225/023; H04R 2225/021; H04R 1/10; H04R 1/1008; H04R 1/1016; H04R 1/1025; H04R 1/1033; H04R 1/1041; H04R 1/105; H04R 1/1058; H04R 1/1066; H04R 2420/07; H04R 1/1091; H04R 2460/03; H04R 25/40; H04R 25/453; H04R 25/70; H04R 25/305; H04R 25/554; H04R 25/552; H04R 25/558; H04R 25/2407; H04R 2201/107; H04R 2201/109; H04R 5/0335; H04B 7/0834; H04B 5/00; G08B 23/00; H04M 1/00; H04M 1/05; H04M 1/1066; H04M 1/08; H04M 1/0258; H04M 1/0281; H04M 1/6058;

(Continued)

(56) References Cited

U.S. PATENT DOCUMENTS

8,243,701 B2   8/2012   Palm
9,398,361 B1 * 7/2016   Jaques ................ H04R 1/1041
(Continued)

*Primary Examiner* — Leshui Zhang
(74) *Attorney, Agent, or Firm* — Avek IP, LLC; Mark C. Young (57) ABSTRACT

Wireless, wearable audio devices and methods for assigning position and operational controls. Wireless audio devices or earbuds are described that are provided as a pair in which both audio devices are physically substantially identical. In use, the audio devices are assigned a right or left position associated with the respective ear of the user in which they are to be disposed. Control surfaces are similarly assigned to provide particular control functionalities on a particular side of the user. Master and slave designations are provided and may be swapped based on a battery status of the respective audio devices. Battery usage and the duration of available use of the pair of audio devices may thus be maximized.

18 Claims, 7 Drawing Sheets

(58) Field of Classification Search
CPC .. H04M 1/1025; H04M 1/1075; H04M 1/105; H04M 1/1058; H04W 92/18; H01Q 1/273; H01Q 1/44; H01Q 21/28; H01Q 25/00; H01Q 9/14; G06F 3/013
USPC .......... 381/74, 72, 75, 76, 312–331; 700/94
See application file for complete search history.

(56) References Cited

U.S. PATENT DOCUMENTS

| | | | |
|---|---|---|---|
| 9,949,205 B2 | 4/2018 | Newham | |
| 10,966,012 B2 | 3/2021 | Linden et al. | |
| 2007/0086600 A1* | 4/2007 | Boesen | H04R 25/554 |
| | | | 381/79 |
| 2008/0051166 A1* | 2/2008 | Kang | H04R 1/1091 |
| | | | 455/575.7 |
| 2008/0132293 A1* | 6/2008 | Gundlach | H04M 1/0258 |
| | | | 455/569.1 |
| 2011/0007916 A1* | 1/2011 | Chapero-Rueda | H04R 25/552 |
| | | | 381/315 |
| 2013/0182867 A1* | 7/2013 | Knowles | H04B 7/0834 |
| | | | 381/74 |
| 2014/0079238 A1* | 3/2014 | Bastide | H04R 5/033 |
| | | | 381/74 |
| 2016/0157026 A1* | 6/2016 | Guindi | H04R 25/305 |
| | | | 381/60 |

\* cited by examiner

CONTROL HANDOFF AND POWER HANDLING AUDIO DEVICE

CROSS-REFERENCE TO RELATED APPLICATIONS

This application claims the benefit of U.S. Provisional Patent Application No. 62/543,585 filed Aug. 10, 2017, the disclosure of which is hereby incorporated herein in its entirety by reference.

BACKGROUND

Wireless technologies and miniaturization of computer hardware have exploded in recent years to enable a variety of new applications. One such application is the wearable audio device or headphone or earbud. Traditional wearable audio devices employed a pair of speakers tethered by respective wires to a single headphone jack, which could be plugged into an audio player or other device. Subsequent audio devices eliminated the wires tethering the speakers to the audio player in lieu of a wireless communication system. Early wireless audio devices employed a wired connection between speaker units, but more recent technologies enable completely wireless and physically separate speaker units, which can be installed in or on the ear.

Control of these individual speaker units, referred to herein as earbuds for simplicity, typically employs a master and slave relationship between the earbuds. One of the earbuds is configured to be a master device that communicates with both a control unit, e.g. an audio player or similar computing device and with the other earbud of the pair, referred to as the slave device. The slave device only communicates with the master device. The master and slave earbuds are thus constructed or manufactured differently from one another so as to include only the necessary components. For example, the slave earbud does not need to include components, including software and hardware, for communicating with the control unit. In some available configurations, the control unit communicates with both of the earbuds directly rather than only through the master. Forthcoming standards, such as BLUETOOTH 5.0 may also provide the control unit with the ability to pair with and/or communicate with multiple devices simultaneously. In such configurations, the earbuds may still be given master and slave assignments and may employ a syncing signal therebetween to ensure that their outputs are synchronized.

The functionalities of the master and slave earbuds are also configured for use in a particular one of the user's ears. The form factor associated with the master and slave earbuds are thus also typically configured to require use in a particular ear of the user in order to maintain their specific functionalities on a particular side of the user's head. For example, a housing of a master earbud might be configured to only fit in a right ear of the user with the master earbud being configured to provide a right audio channel and a particular set of control surfaces that are accessible by the user's right hand. The slave earbud is thus provided with a form factor that is configured to only fit in the left ear and to provide a left audio channel as well as a set of control surfaces operable by the user's left hand. These differences between the master and slave earbuds increase production and design costs by doubling the number of form factors and component layouts that must be designed and produced. And having different earbuds places additional requirements on the user to identify the proper earbud for insertion into each ear and/or into a storage or charging device.

Dedication of a master and slave earbud also affects power consumption of the earbuds. The master earbud must communicate with both the control device and the slave earbud and thus consumes a greater amount of energy than the slave earbud. The master device will thus exhaust a battery faster than the slave earbud, assuming they are both provided with the same or similar battery. Such a situation leaves the pair of earbuds inoperable when the master device battery is exhausted even though the slave earbud has energy remaining.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, wearable audio devices that are adapted for disposal and use in either ear of a user and methods and systems for assigning operational control and maximizing power usage efficiency.

The wearable audio devices, or earbuds, are provided in pairs. Each of the audio devices in the pair is identically configured and interchangeable, e.g. each audio device includes communications components for communicating with both a control device and the other audio device, as well as hardware and software components useable for operation in a master and a slave configuration.

In use, each of the audio devices is initially assigned to a right or a left channel or position. The assignment may be determined based on which audio device a user removes from a charging case first, which audio device is first to be powered on, which audio device receives a particular input, or through another indication. The assignment may be determined by control logic onboard the audio devices or the audio devices may be assigned their respective positions by a separate controller provided by the control device or in the charging case. The audio devices may be inserted into the ear of the user associated with the respective assignment, i.e. the audio device assigned to the right position is installed in the right ear of the user.

Control surface functions on each of the audio devices may also be assigned based on the right/left position assignments. For example, in one configuration, volume controls are assigned to the right ear position. As such, no matter which of the two audio devices is disposed in the right ear position, the control surfaces thereof will operate to provide the volume control functions.

A master and slave designation is also provided. The master and slave designation may be made based on similar indications as those used to assign the positions. For example, the first audio device removed from the charging case might be designated as the master device. The master and slave designation might also be provided based on another indication such as a battery power status of each of the audio devices, among other indications. The master device controls operation and/or provision of audio output by the pair of audio devices by communicating with the control device and with the slave audio device. The slave audio device provides audio outputs received from the master audio device and as instructed by the master audio device.

During use, the battery level of the master and slave audio devices is monitored. When the battery level of the master audio device reaches a level that is a predetermined amount less than that of the slave audio device, the master and slave designations of the two audio devices may be swapped. Swapping is completed while maintaining the right/left position assignments while also preferably maintaining continuity of the audio outputs from the audio devices. The power consumption of each of the audio devices may thus be maintained relatively equal, and the duration of their combined use may be maximized.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about," "approximately," or "substantially" as used herein denote deviations from the exact value by +/−10%, preferably by +/−5% and/or deviations in the form of changes that are insignificant to the function.

Figure 1:
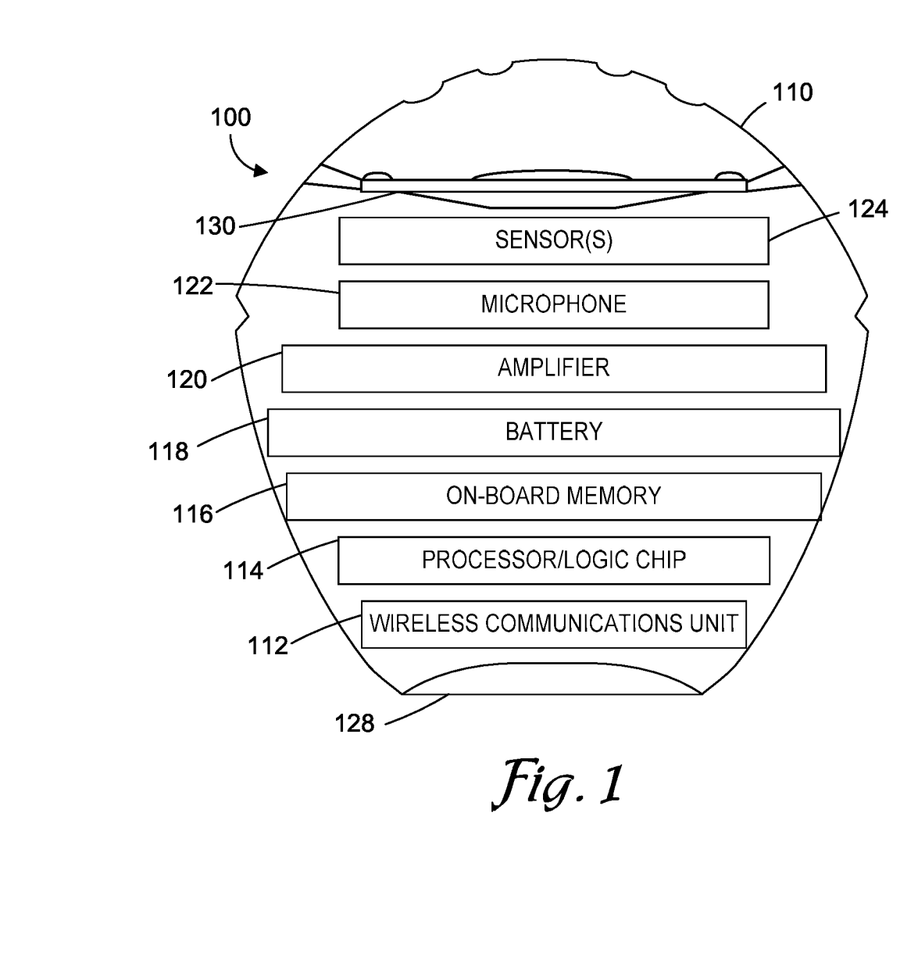
FIG. 1 is a schematic cross-sectional view of an audio device depicted in accordance with an exemplary embodiment.
Figure 2:
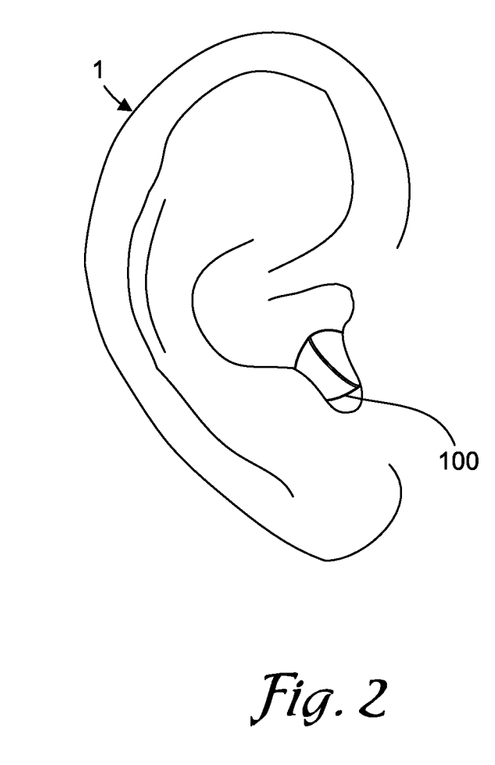
FIG. 2 is an illustrative view of the audio device of FIG. 1 disposed in an ear of a user depicted in accordance with an exemplary embodiment.
Figure 6:
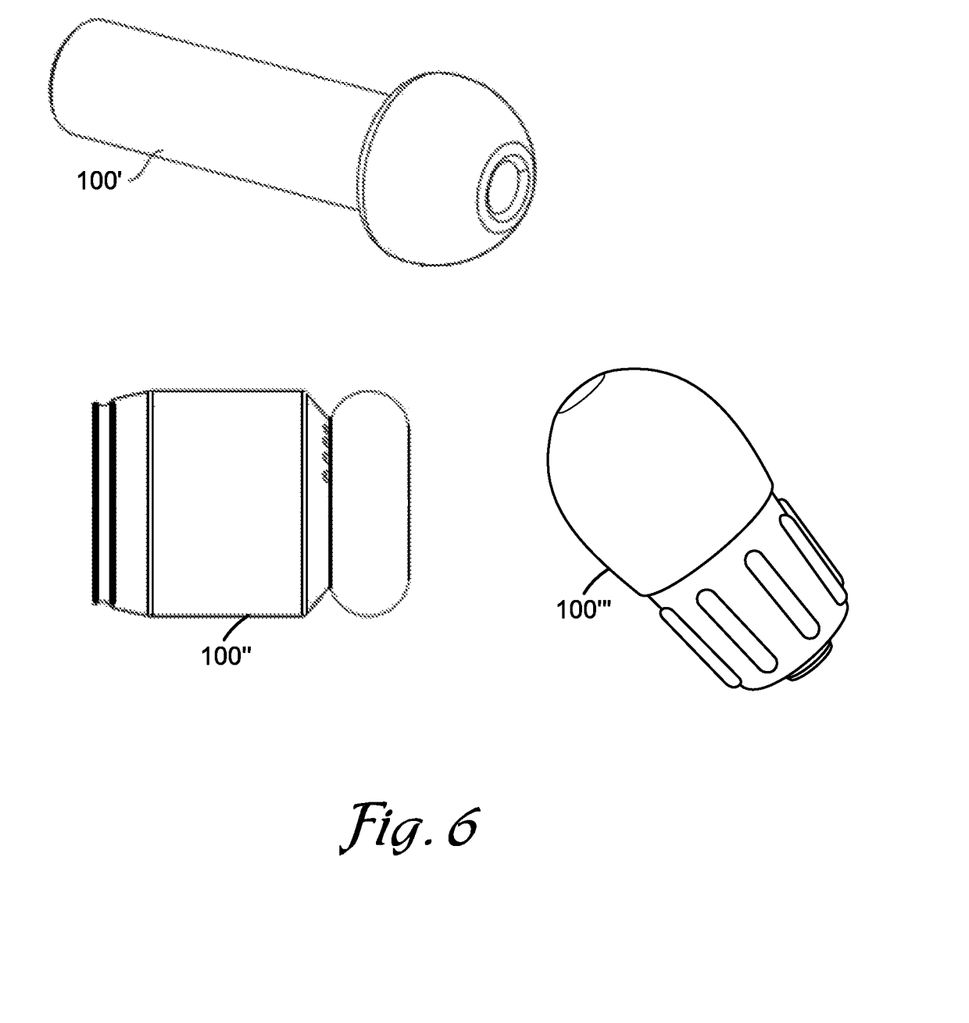
FIG. 6 depicts three exemplary audio device configurations or form factors that may be employed in embodiments.

With initial reference to FIG. 1, an exemplary wireless, wearable audio device or earbud 100 is described in accordance with an exemplary embodiment. The audio device 100 may be interchangeably referred to herein as an earbud 100 for simplicity, but such is not intended to limit embodiments to any particular forms or functions that may be associated with the term "earbud." For example, several exemplary earbuds 100', 100" and 100'" having various form factors are depicted in FIG. 6. As depicted in FIG. 1, the audio device 100 includes a housing 110 configured in a spheroidal form but any desired form can be employed. As depicted in FIG. 2, the audio device 100 is configured for insertion or disposal in an external portion or pinna of a human ear 1 so as to direct an audio output toward the ear 1 or an ear canal thereof to be heard by a user 2.

A variety of components are disposed in the housing 110 and configured for operation of the audio device 100 including a wireless communications unit 112, a processor or logic chip 114, an on-board memory 116, and a battery 118. An amplifier 120, a microphone 122, and a variety of sensors 124 might also be included, among a variety of other components. It is to be understood that one or more of these components can be combined or their functions performed by another component. For example, processors can include memory. Additionally, detail of the connections and communications between the components is not necessary for conveying an understanding of embodiments of the invention and is not described in detail herein.

Figure 3:
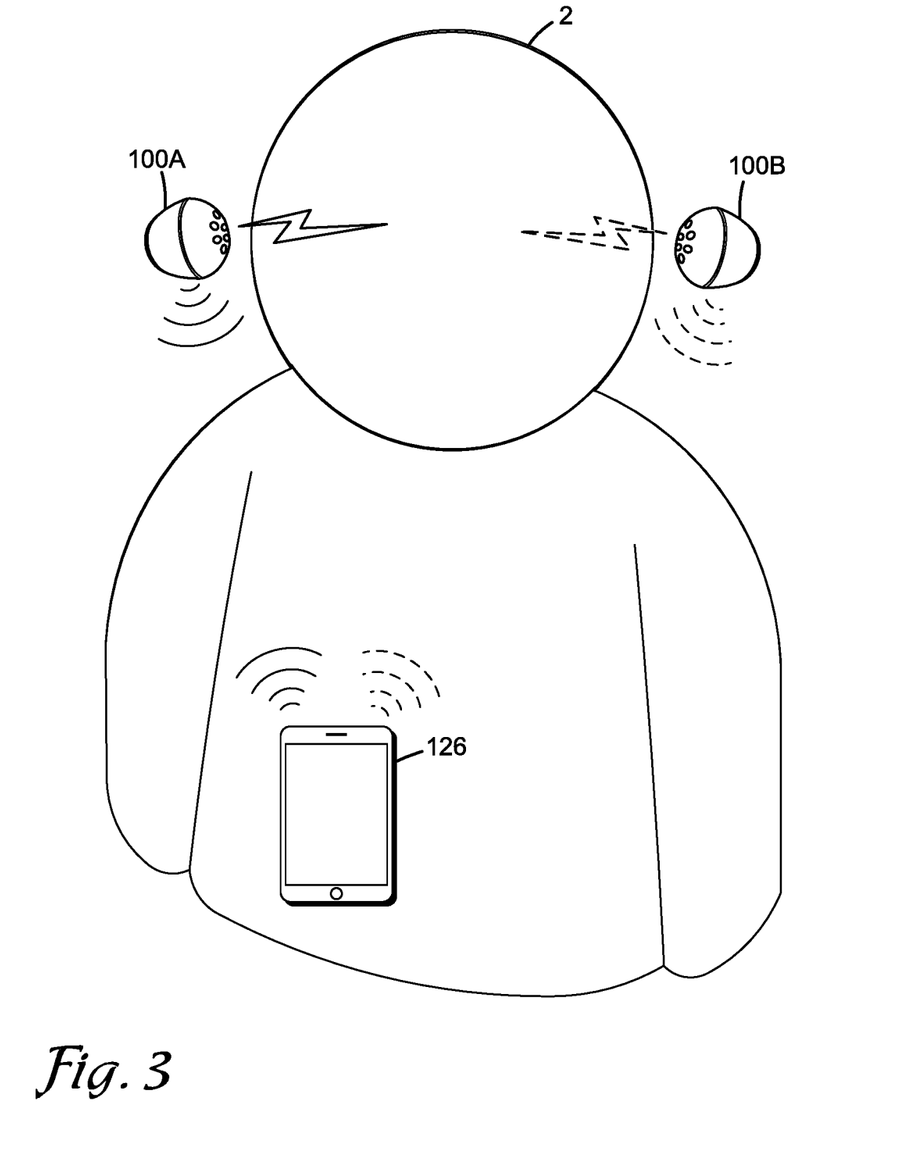
FIG. 3 is a schematic view of a pair of audio devices and a control device in use by a user depicted in accordance with an exemplary embodiment.

The wireless communications unit 112 employs wireless communications protocols, standards, hardware, and the like, available in the art, such as, for example, the BLUETOOTH standards developed by the Bluetooth Special Interest Group. As shown in FIG. 3, the wireless communications unit 112 provides wireless communications between the audio device 100 and a control device 126 such as a digital music player, a cellular telephone, a computer, or similar wireless communications-enabled electronic device. The control device 126 provides audio data, and control signals, among other communications to the audio device 100 via wireless communications with the wireless communications unit 112 for use by the audio device 100. The audio device 100 may also transmit a variety of communications to the control device 126 via the wireless communications unit 112 like, for example, handshake signaling for creating a secure connection therebetween, audio data collected by the microphone 122, or command signals to the control device 126, e.g. to change an audio file being played, among others.

The processor or logic chip 114 executes one or more programs or routines useable to produce an audible output using audio data received from the control device 126 via the wireless communications unit 112. The processor 114 may process audio inputs received from the microphone 122 for communication to the control device 126.

Additionally, one or more control surfaces 128 can be provided on the audio device 100 from which the processor 114 can receive input commands. For example, a user might provide an input to change an audio track being played, to increase a volume of the audio output, or to interact with an application executing on the control device 126. The control surfaces 128 can include touch interfaces, such as capacitive surfaces, buttons, switches, rotatory dials, or the like and enable a user to provide inputs to the audio device 100 or to the control device 126.

Figure 8:
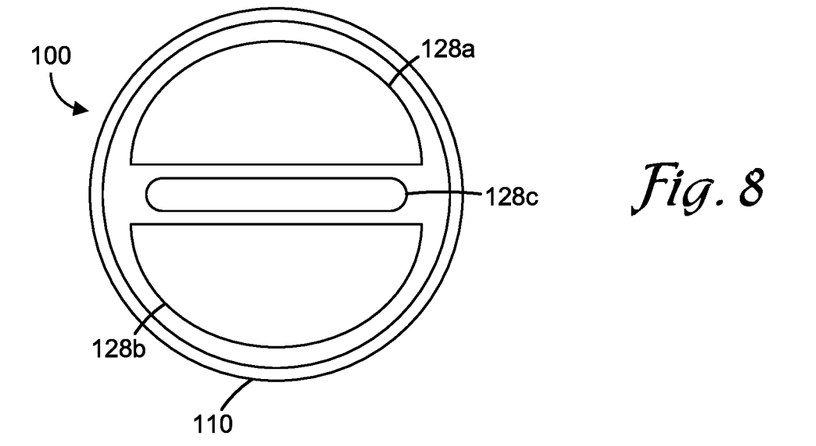
FIG. 8 is an elevational end view of an audio device depicting a plurality of control surfaces in accordance with an exemplary embodiment.
Figure 9:
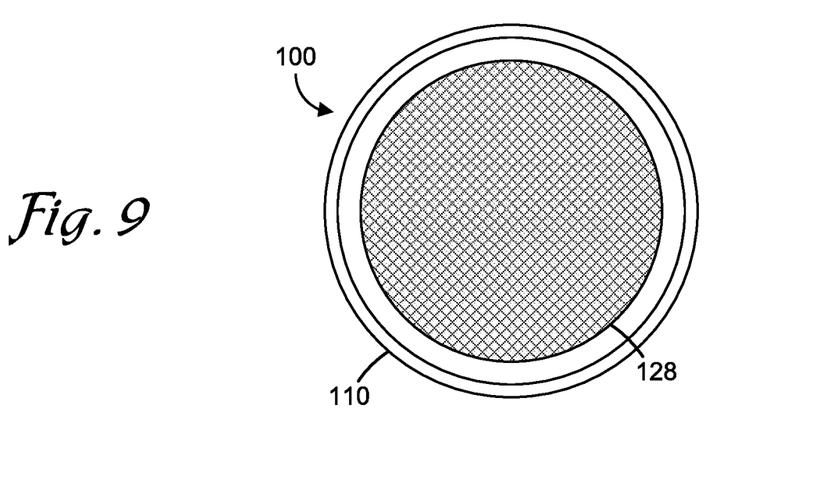
FIG. 9 is an elevational end view of an audio device depicting a single touch interface control surface in accordance with an exemplary embodiment.

The control surfaces 128 can be provided on any surface of the audio device 100 and are preferably located on a surface that is accessible to touch by a user's finger when disposed in the user's ear. For example, FIG. 8 depicts a plurality of touch surfaces or buttons 128a, 128b, and 128c provided on a base or distal end of the housing 110 which might each be assigned a particular function. In another embodiment depicted in FIG. 9, the control surface 128 comprises a capacitive touch interface provided in the base of the housing 110 that can detect a variety of different input gestures that are each associated with a particular command function. In one embodiment, a lower portion of the housing 110 is rotatable with respect to an upper portion to provide input to the audio device 100 or to the control device 126.

In some embodiments, the control surfaces 128 do not employ an actual physical surface on the audio device 100, but rather one or more sensors, such as the sensor 124, that is configured to detect motion or gestures. For example, a control surface 128 might comprise an accelerometer that detects a tap, shake, or other movement of the audio device 100 or might comprise a radar detection component that employs radar technologies to detect user hand motions or gestures near the audio device 100, among a variety of other input methods.

The on-board memory 116 is useable by the processor 114 for execution of programs and routines but is not configured to provide storage of audio or other data for later playback, e.g. the memory 116 cannot be used to store audio data for a plurality of songs on the audio device 100 for later playback in a manner similar to a digital music player—such tasks are reserved for the control device 126. In another embodiment, the memory 116 can be configured for storage of one or more data or audio files to enable functioning of the audio device 100 without the associated control device 126.

The amplifier 120 is employed by the processor 114 to provide outputs useable by a sound-production unit 130. The output of the amplifier 120 comprises electrical signals, which may be amplified, that are communicated to the sound-production unit 130 via an electrical wire or conductor in a known manner. In one embodiment, the sound-production unit 130 may employ as air pressure waves carried by a hollow conduit, or as light rays carried by fiber-optic conduits in place of electrical communications.

The microphone 122 is any available microphone useable to receive audio inputs from a user including, for example, vocalizations provided during a telephone call as well as voice commands to the control device 126 when such capabilities are present in the control device 126. Additional microphones 122 may be provided at disparate locations on the audio device 100 for use in collecting audio inputs from a user's surroundings or environment. Such audio inputs are useable by the processor 114 or the control device 126 for noise cancellation among other uses.

Figure 4:
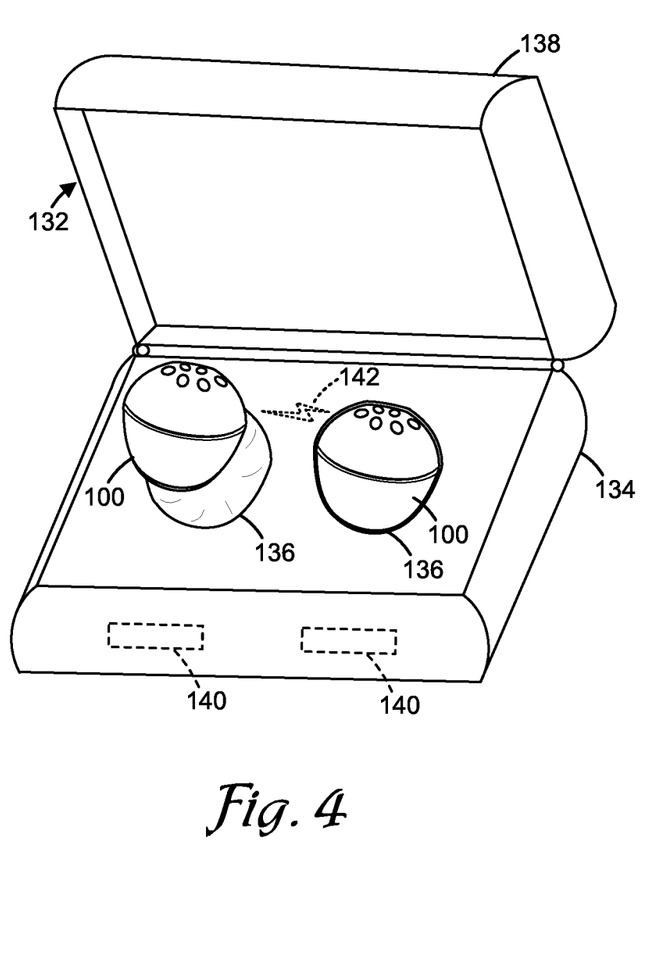
FIG. 4 is a perspective view of a pair of audio devices in a charging device depicted in accordance with an exemplary embodiment.

As depicted in FIGS. 3 and 4, the audio device 100 is preferably provided and used as a pair of audio devices 100. Each audio device 100 of the pair is identical in construction and configuration of both hardware and software. The audio devices are provided with reference numerals 100A and 100B in FIG. 3 only to differentiate for discussion purposes—the audio devices 100A and 100B are otherwise identical. As such, the audio devices 100 of the pair are completely interchangeable and useable in either a right or a left ear 1 of the user 2.

A charging device 132 is provided with the audio devices 100. The charging device 132 includes a battery along with any additional components (not shown) necessary to receive and hold an electrical charge and to appropriately supply a charge to the audio devices 100 to charge their respective batteries 118. The charging device 132 may be configured to function as a case for storage of the audio devices 100 when not in use and during charging thereof.

The charging device 132 is depicted in FIG. 4 as a case having a base 134 with a depression 136 configured to receive either of the audio devices 100 and a hinged lid 138. It is however, understood that the charging device 132 may take a variety of other configurations without departing from the scope of exemplary embodiments described herein. Each of the depressions 136 preferably include a respective inductive charging coil or similar non-contact charging system 140 configured to supply an electrical charge capable of charging the battery 118 in the audio device 100 when disposed in the depression 136. Alternatively, the depression 136 may include one or more contacts (not shown) configured to mate in electrical communication with contacts on the audio device 100 installed therein to charge the battery 118 in the audio device 100. The charging device 132 may also be configured to communicate data, commands or the like to the audio devices 100 when disposed therein or after removal therefrom. In one embodiment, the audio devices 100 may also communicate with one another while in the charging device 132 or after removal therefrom as depicted at reference numeral 142.

Figure 5:
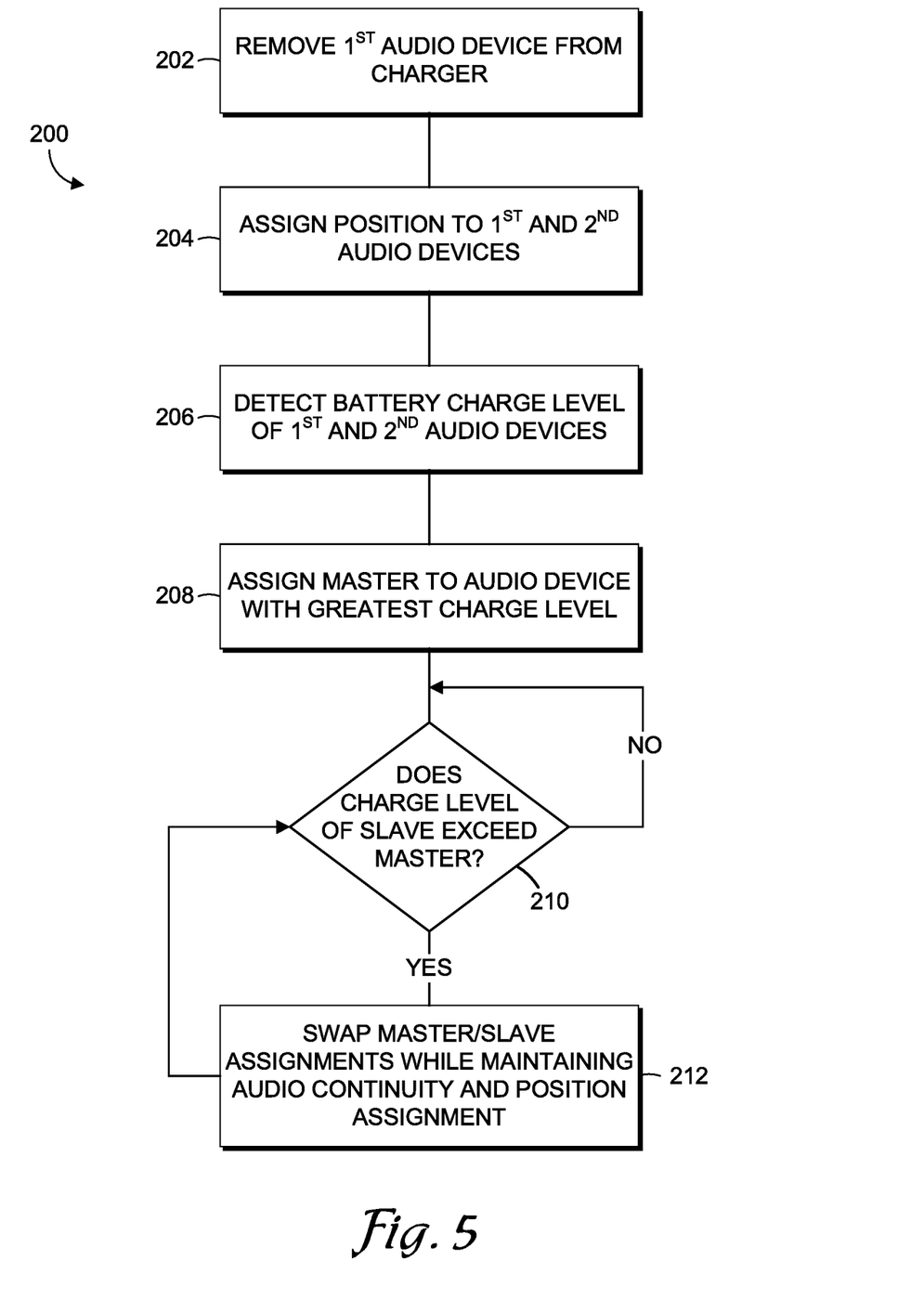
FIG. 5 is a flow diagram of a method for control handoff and power handling for a pair of wireless wearable audio devices depicted in accordance with an exemplary embodiment.

With reference now to FIGS. 3 and 5, a method 200 for operation of the audio devices 100 is described in accordance with an exemplary embodiment. Initially, the audio devices 100 are disposed in the charging device 132 and their batteries 118 are fully charged. A first of the audio devices 100A is removed from the charging device 132, as depicted at step 202. At step 204 a position—left or right—is assigned to the audio device 100A and the other of the positions is assigned to the other audio device 100B. The determination of which position to assign to each audio device 100 may be completed in a variety of ways. As described herein, the first audio device 100A to be removed from the charging device 132 is assigned to the right position. The user 2 may thus always dispose the first audio device 100 removed from the charging device 132 in his right ear 1 and the second audio device 100 removed from the charging device 132 in his left ear. However, in other embodiments, the first audio device 100 might be automatically assigned to the left position.

The assignment of the audio devices 100 to the left or right position is preferably made based on a position-determinative event which may comprise the removal of one of the audio devices 100 from the charging device 132 as described above. However, other position-determinative events might be employed including, for example, a particular user input to one of the audio devices 100, the charging device 132, or to the control device 126, or a condition sensed by the sensor 124.

As described previously, the audio devices 100A, 100B are identical and thus can be disposed and used in either ear 1 of the user 2. The assignment of position to the audio devices 100 is thus employed to instruct the audio output to be provided by each of the audio devices (i.e. left or right audio channels of, for example a stereo audio output) and may be employed to define functions provided by the control surfaces 128 on each of the audio devices 100.

In another embodiment, another indication or position-determinative event is employed to determine which position is to be assigned to the audio devices 100. For example, the user 2 may provide an input to the control surface 128 on one of the audio devices 100 to indicate a desired position assignment for the particular audio device 100. Or the sensors 124 in the audio devices 100 may be employed to detect which of the audio devices 100 is first disposed in the ear 1 of the user 2 and a particular position assignment made based thereon, or the sensors 124 might be employed to determine an orientation and/or particular movement of one or both of the audio devices 100 that is useable to determine an appropriate position assignment, among a variety of other ways. In one embodiment, the position assignment is user configurable, i.e. the user 2 can customize which and/or how the audio devices 100 are assigned a position.

In one embodiment, the audio devices 100 may be used one at a time in mono mode. Such a mode may be indicated by the user 2 via the control device 126 or the audio devices 100 may assume the mono mode after a predetermined period of time elapses with one of the audio devices 100 removed from the charging device 132 and one remaining in the charging device 132, among other means for identifying the mode of use. In the mono mode the audio device 100 may provide a mono signal audio output in contrast to a stereo output. Control surfaces 128 may also be appropriately configured for such use. As such, the overall duration of use of the pair of audio devices 100 may be effectively doubled.

At step 206 the charge level of the batteries 118 in each of the audio devices 100 is detected and the audio device 100 with the greatest charge level is designated as the master device 100A; the other of the audio devices 100B is designated as the slave. When the audio devices 100 are both fully charged or have an equal battery charge level, the audio device 100 that is first removed from the charging device 132 is designated as the master device 100A. In another embodiment, when the charge levels are equal the audio device assigned the right position is designated as the master device 100A, however it is understood that other methods may be employed to designate the master device 100A as such and such methods are within the scope described herein.

The assignment of position and the designation of master and slave may be completed independently by the pair of audio devices 100, e.g. without communication or instruction from another controlling device such as by communication 142 therebetween. Such communications may employ BLUETOOTH, BLUETOOTH low energy (BLE) and/or near-field magnetic induction (NFMI) communication technologies and protocols among others. In another embodiment, control logic may be provided in the charging device 132 or in the control device 126 that may instruct assignment of the position and designation of master and slave for the audio devices 100. It is understood that the assignment of the position and the designation of master and slave may be completed in another order based on a particular configuration of the audio devices 100 without departing from the scope of embodiments described herein.

An initial setup of the audio devices 100 with a control device 126 may be carried out. The setup may include a series of communications between the audio devices 100 or just the master audio device 100A and the control device 126 to complete processes, such as pairing, among others known in the art for providing wireless communications between such devices. Description of such processes is not necessary for an understanding of embodiments of the invention and is thus not provided herein.

To receive audio output the user 2, may use the control device 126 to select an audio file or track to be played or output by the audio devices 100. The control device 126 wirelessly transmits or streams the audio file to the audio device 100A which receives the audio file and generates an audible output based on the assigned position. The audio device 100A, as the master device, also communicates with the slave audio device 100B to communicate the appropriate content for production of audio output by the audio device 100B corresponding to its assigned position. In one embodiment, the master audio device 100A communicates content for both positions to the slave audio device 100B and the slave audio device 100B processes the content to produce the appropriate audio output for its assigned position.

The user might alternatively employ the control surfaces 128 on the audio devices 100 to instruct the control device 126 to begin playing a desired audio track, skip to a next or a previous track, pause, rewind, fast-forward, or stop playing an audio track. The user might also use the control surfaces 128 to navigate menus, interact with software applications, answer incoming telephone calls, provide voice commands, or the like. The functions provided by the control surfaces 128 on each of the audio devices 100 may be designated based on the position assignment of the respective audio device 100. For example, control functions like volume up/down may always be provided by the audio device 100A assigned to the right position while control functions for changing tracks may always be provided by the audio device 100B assigned to the left position. The control function assignments may be configurable and customizable by the user 2.

During use and operation of the audio devices 100, the charge level of the batteries 118 is monitored, as depicted at step 210. The monitoring may be conducted continuously, intermittently, periodically or on another temporal basis, or may be conducted upon receipt of an input from the user 2 or an application executing on the control device 126 or the audio devices 100. The master audio device 100A is tasked with communicating with both the control device 126 and with the slave audio device 100B, which may utilize multiple means of communication. The master audio device 100A may also be tasked with a greater level of processing for production of the audio outputs of the audio devices 100. The master audio device 100A thus typically depletes its battery 118 at a greater rate than the slave audio device 100B.

As depicted at step 212, when the battery level of the master audio device 100A reaches a level that is at least a predetermined amount less than that of the slave audio device 100B, the master and slave designations are swapped. Swapping of the master and slave designations thus relieves the previously master audio device 100A of the additional communication and/or processing tasks and thus slows the rate of battery consumption thereby. Conversely, the previously slave audio device 100B is now tasked with the additional communication and/or processing but can take advantage of the greater remaining battery reserves of the device 100B. The monitoring of the battery levels continues and the master and slave designations may be swapped repeatedly to maximize the battery usage of the pair of audio devices 100.

Swapping of the master and slave designations is preferably conducted such that continuity of the audio output and any other functions provided by the audio devices 100 is not affected or noticed by the user. For example, swapping of the master and slave designations occurs without alteration of the position and control surface assignments of each of the audio devices 100. In some embodiments, the audio output may be affected, but such effects are preferably minimized so as to go unnoticed by the user or to at least be minimally invasive to the user's listening experience. For example, swapping may be scheduled to occur between output of audio files or at another break or stoppage in the audio output. In another embodiment, swapping might be limited to occur only when a sufficient buffer is available or any break in the audio channel continuity may be less than about 1-2 seconds or preferably less than about 0.5 seconds or preferably less than about 0.1 seconds, among other options for maintaining continuity. In one embodiment, an audible, tactile, or visible signal may be provided to the user by the one or both of the audio devices 100 and/or by the control device 126 that indicates that a swap is about to occur. The user may be provided with an option to cancel or postpone the swap to avoid a break in continuity. For example, the user may be signaled that a swap is about to occur while on a phone call and may elect to postpone the swap. Applications executing on the control device 126 may also be enabled to prevent, delay, or otherwise reschedule the swap. The swap may be postponed for a predetermined period of time, until the phone call is ended, or until occurrence of another event or time period. Swapping of the master and slave designations does not affect the positions or control surface functions assigned to the audio devices 100.

Figure 7:
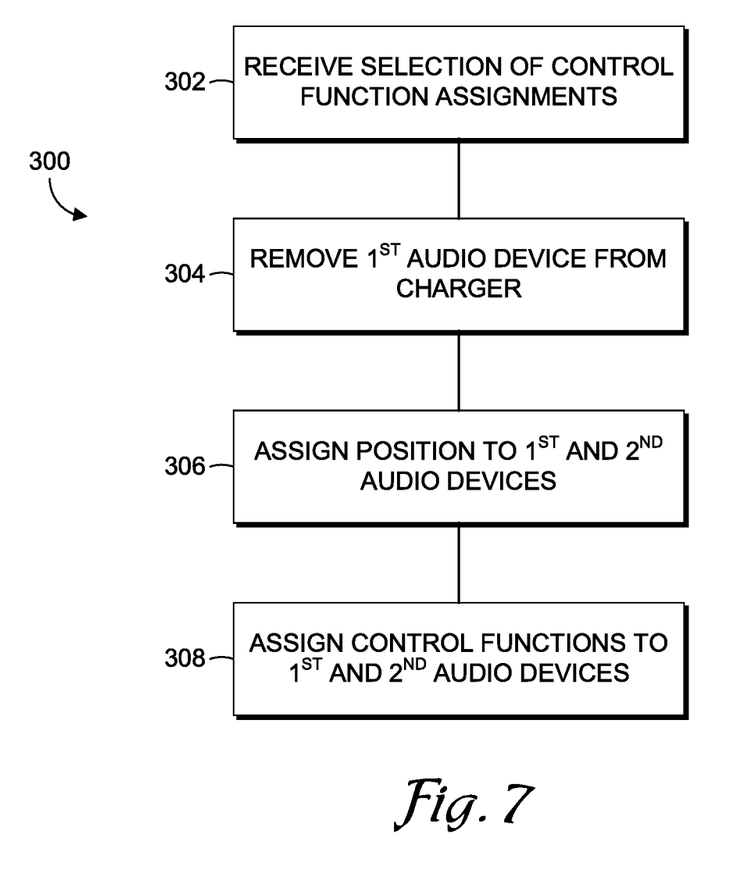
FIG. 7 is a flow diagram depicting a method for assigning control functions to control surfaces on audio devices in accordance with an exemplary embodiment.

FIG. 7 depicts a method 300 for assigning control functions to the control surfaces 128. As discussed previously, the audio devices 100A and 100B are identical and can be employed in either ear 1 of the user 2 interchangeably. As such, the control surfaces 128 can be assigned functions based on the position assignment of the respective audio devices 100. These assigned functions may also be selectively customizable by the user 2, as depicted at step 302 in which a selection of the control function assignments is received from the user 2. For example, the user 2 may select to have volume up and down controls on the audio device 100 disposed in her right ear 1 and controls for skipping audio tracks on the audio device 100 in her left ear 1. At the time the functions are assigned by the user 2, the audio devices 100 are preferably disposed in the charging device 132 and thus are not yet assigned left or right positions.

At step 304 a first of the audio devices 100A is removed from the charging device 132 and is assigned a left or right position at step 306 as described previously with respect to the method 200. The removal of the audio device 100A may be considered a position-determinative event that is used to The control surfaces 128 are assigned their respective functionalities based on the left or right position assignment, as depicted at step 308. Thus continuing the example above, if the first audio device 100A removed from the charging device 132 is assigned to the right position at step 306, then control functions for volume up/down are assigned to the respective control surfaces 128 on the audio device 100A at step 308. The control surfaces 128 of the second audio device 100B which is assigned the left position at step 306 are then assigned the control functions for skipping tracks.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A method for operating a pair of wireless audio devices, the wireless audio devices being substantially physically identical and interchangeably wearable in either a left or a right ear of a user, the method comprising:

detecting a position-determinative event that indicates which of the left ear or the right ear of the user each of the wireless audio devices is to be assigned, each of the wireless audio devices including a sensor that is configured to detect the position-determinative event as one or both of an orientation or a movement of the respective wireless audio device, wherein each of the pair of wireless audio devices communicates with the other of the pair of wireless audio devices to coordinate assignment of a left ear or a right ear position to each of the wireless audio devices without communication or instruction from another controlling device, assigning a first audio device of the pair of wireless audio devices to a first use position based on the position-determinative event, the first use position being in one of the left or right ear of the user;

receiving a delegation of a first control function to the first use position, the delegation indicating that the first control function is to be assigned to a control surface of one of the pair of wireless audio devices that is assigned to the first use position; and assigning the first control function to a first control surface of the first audio device based on the assignment of a left ear or right ear position, the first audio device being assigned to the first use position.

2. The method of claim 1, further comprising:

receiving a delegation of a second control function to a second use position, the second use position being the opposite of the left or the right ear of the user from the first use position, and the delegation indicating that the second control function is to be assigned to a control surface of one of the pair of wireless audio devices that is assigned to the second use position;

assigning a second audio device of the pair of wireless audio devices to the second use position; and assigning the second control function to a second control surface of the second audio device based on the delegation of the second control function.

3. The method of claim 1, wherein the position-determinative event comprises removal of the first audio device from a storage case.

4. The method of claim 3, wherein the storage case comprises a charging device.

5. The method of claim 1, wherein the position-determinative event comprises disposal of the first audio device on or in the left or the right ear of the user.

6. The method of claim 1, wherein the position-determinative event comprises receiving an input from the user by the first audio device.

7. The method of claim 1, wherein detecting the position-determinative event is completed by one or more of the first audio device and a second audio device, and assigning the first audio device to the first use position is completed by a control device.

8. The method of claim 1, wherein detecting the position-determinative event is completed by one or more of the first audio device and a second audio device, and assigning the first audio device to the first use position is completed by the first audio device and the second audio device communicating with one another.

9. The method of claim 1, further comprising:

determining a first battery charge status of the first audio device;

determining a second battery charge status of a second audio device of the pair of wireless audio devices;

when the first battery charge status is greater than the second battery charge status, configuring the first audio device as a master device and the second audio device as a slave device; and when the first battery charge status is less than the second battery charge status, configuring the first audio device as the slave device and the second audio device as the master device.

10. The method of claim 9, further comprising:
determining that a master device battery charge status is a predetermined amount less than a slave device battery charge status; and
reconfiguring the master device to become the slave device and the slave device to become the master device.

11. A method for operating a pair of wireless audio devices, the wireless audio devices being substantially physically identical and interchangeably wearable in either a left or a right ear of a user and each including at least one control surface by which to receive an input from a user, the method comprising:
detecting a position-determinative event that indicates which of the left ear or the right ear of the user each of the wireless audio devices is to be assigned, each of the wireless audio devices including a sensor that is configured to detect the position-determinative event as one or both of an orientation or a movement of the respective wireless audio device, wherein each of the pair of wireless audio devices communicates with the other of the pair of wireless audio devices to coordinate assignment of a left ear or a right ear position to each of the wireless audio devices without communication or instruction from another controlling device;
receiving a delegation of a first control function to a first use position, the first use position being in a selected one of the left ear or the right ear position;
assigning the selected one of the left ear or the right ear position to the first use position based on the position-determinative event, and
assigning the first control function to the at least one control surface of the selected one of the left ear or the right ear audio devices based on the assigning of the first audio device to the first use position.

12. The method of claim 11, further comprising:
receiving delegation of a second control function to a second use position, the second use position being the opposite of the left or the right ear of the user from the first use position and the delegation indicating that the second control function is to be assigned to a control surface of one of the pair of wireless audio devices that is assigned to the second use position;
assigning a second audio device of the pair of wireless audio devices to the second use position; and
assigning the second control function to the at least one control surface of the second audio device based on the assigning the second audio device to the second use position.

13. The method of claim 11, wherein the position-determinative event comprises removal of the first audio device from a storage case.

14. The method of claim 11, wherein detecting the position-determinative event is completed by one or more of the first audio device and a second audio device, and assigning the first audio device to the first use position is completed by a control device.

15. The method of claim 11, wherein detecting the position-determinative event is completed by one or more of the first audio device and a second audio device, and assigning the first audio device to the first use position is completed by the first audio device and the second audio device communicating with one another.

16. The method of claim 11, further comprising:
determining a first battery charge status of the first audio device;
determining a second battery charge status of a second audio device of the pair of wireless audio devices;
when the first battery charge status is greater than the second battery charge status, configuring the first audio device as a master device and the second audio device as a slave device; and
when the first battery charge status is less than the second battery charge status, configuring the first audio device as the slave device and the second audio device as the master device.

17. The method of claim 16, further comprising:
determining that a master device battery charge status is a predetermined amount less than a slave device battery charge status; and
reconfiguring the master device to become the slave device and the slave device to become the master device.

18. A method for operating a pair of wireless audio devices, the wireless audio devices being substantially physically identical and interchangeably wearable in either a left or a right ear of a user and each including at least one control surface by which to receive an input from a user, the method comprising:
detecting a position-determinative event that indicates which of the left ear or the right ear of the user each of the wireless audio devices is to be assigned, each of the wireless audio devices including a sensor that is configured to detect the position-determinative event as one or both of an orientation or a movement of the respective wireless audio device, wherein each of the pair of wireless audio devices communicates with the other of the pair of wireless audio devices to coordinate assignment of a left ear or a right ear position to each of the wireless audio devices without communication or instruction from another controlling device;
assigning a first audio device of the pair of wireless audio devices to a first use position based on the position-determinative event, the first use position being in one of a left or a right ear of the user;
determining a first battery charge status of the first audio device;
determining a second battery charge status of a second audio device of the pair of wireless audio devices;
when the first battery charge status is greater than the second battery charge status, configuring the first audio device as a master device and the second audio device as a slave device;
when the first battery charge status is less than the second battery charge status, configuring the first audio device as the slave device and the second audio device as the master device;
receiving a delegation of a first control function to a first use position, the delegation indicating that the first control function is to be assigned to a control surface of the wireless audio device assigned to the first use position; and
assigning the first control function to the at least one control surface of the first audio device based on the delegation of the first control function.

* * * * *